INVENTOR.
PETER C. GOLDMARK
BY
Brumbaugh, Free, Graves & Donohue
his ATTORNEYS

INVENTOR.
PETER C. GOLDMARK
BY
Brumbaugh, Free, Graves & Donohue
his ATTORNEYS

CONSTANT VELOCITY PHONOGRAPH

Filed March 6, 1967 3 Sheets-Sheet 3

INVENTOR.
PETER C. GOLDMARK
BY
Brumbaugh, Free, Graves & Donohue
his ATTORNEYS 3,536,331
CONSTANT VELOCITY PHONOGRAPH Peter C. Goldmark, Stamford, Conn., assignor to Columbia Broadcasting System, Inc., New York, N.Y., a corporation of New York
Filed Mar. 6, 1967, Ser. No. 620,710
Int. Cl. G11b *3/10, 3/36*
U.S. Cl. 274—13 8 Claims

ABSTRACT OF THE DISCLOSURE

In the particular embodiment of the invention described herein, a carriage, supported for radial motion above one side of a record, carries a transducer and stylus, and a friction drive wheel engaging the record surface. The stylus and drive wheel move together across the record so that the record groove moves past the stylus at substantially uniform linear velocity as the carriage moves radially inwardly over the disc. The carriage is moved along a lead screw which also extends above the record disc and which is rotated by a ratchet-pawl combination, the pawl being actuated once during each complete revolution of the record disc.

BACKGROUND OF THE INVENTION

This invention relates to constant velocity phonograph apparatus and, more particularly, to a new and improved constant velocity phonograph arrangement especially adapted to permit utilization of a large proportion of a record surface at very low speeds.

In order to increase the playing time for each side of a phonograph record disc, it has been proposed heretofore to reduce the speed of rotation of the disc and to decrease the width of the record groove. In my copending U.S. application Ser. No. 291,915, filed July 1, 1963, for "Disc Recording and Reproducing System" for example, there is described a system utilizing extremely narrow grooves and a low turntable speed.

Because of the large variation in the linear velocity of the record groove between the outer and inner portions of the record disc, however, it has been necessary to provide equalization networks in order to obtain uniformly high quality at low turntable speeds, such as, 16⅔ r.p.m. For turntable speeds lower than 16⅔ r.p.m., in spite of such equalization networks, the fidelity of reproduced high frequency information from the inner groove portions is impaired.

SUMMARY OF THE INVENTION

Accordingly, it is an object of the present invention an improved phonograph record and apparatus providing substantially uniform linear groove velocity which overcomes the above-mentioned disadvantages of the prior art.

It is another object of the present invention to provide an improved phonograph apparatus wherein the fidelity of the recorded information is maintained at a maximum for all frequencies at the inside and outside groove portions of the record disc.

It is another object of the present invention to provide an improved photograph record and apparatus providing substantially increased playing time for a given area of recording.

These and other objects of the invention are accomplished by providing phonograph apparatus including a transducer responsive to modulations in the groove of a record disc and movable across the surface of the disc, and a record drive member engageable with the surface of a record disc for driving the disc at a predetermined linear groove speed, the record drive member being movable in conjunction with the transducer motion across the surface of the record disc.

In one embodiment of the invention, a carriage extends above a portion of the record disc for supporting the transducer and the drive member. Further included is a stepping assembly responsive to the movement of the record disc for incrementally moving the carriage laterally across the record disc. The stepping assembly includes a lead screw in threaded engagement with the carriage during operation, a rotatable ratchet which is secured to the lead screw and a pawl for driving the ratchet. The pawl, in turn, is actuated once each complete revolution by a retractable pin member mounted in the turntable supporting the record disc.

DESCRIPTION OF THE PREFERRED EMBODIMENT

Figure 1:
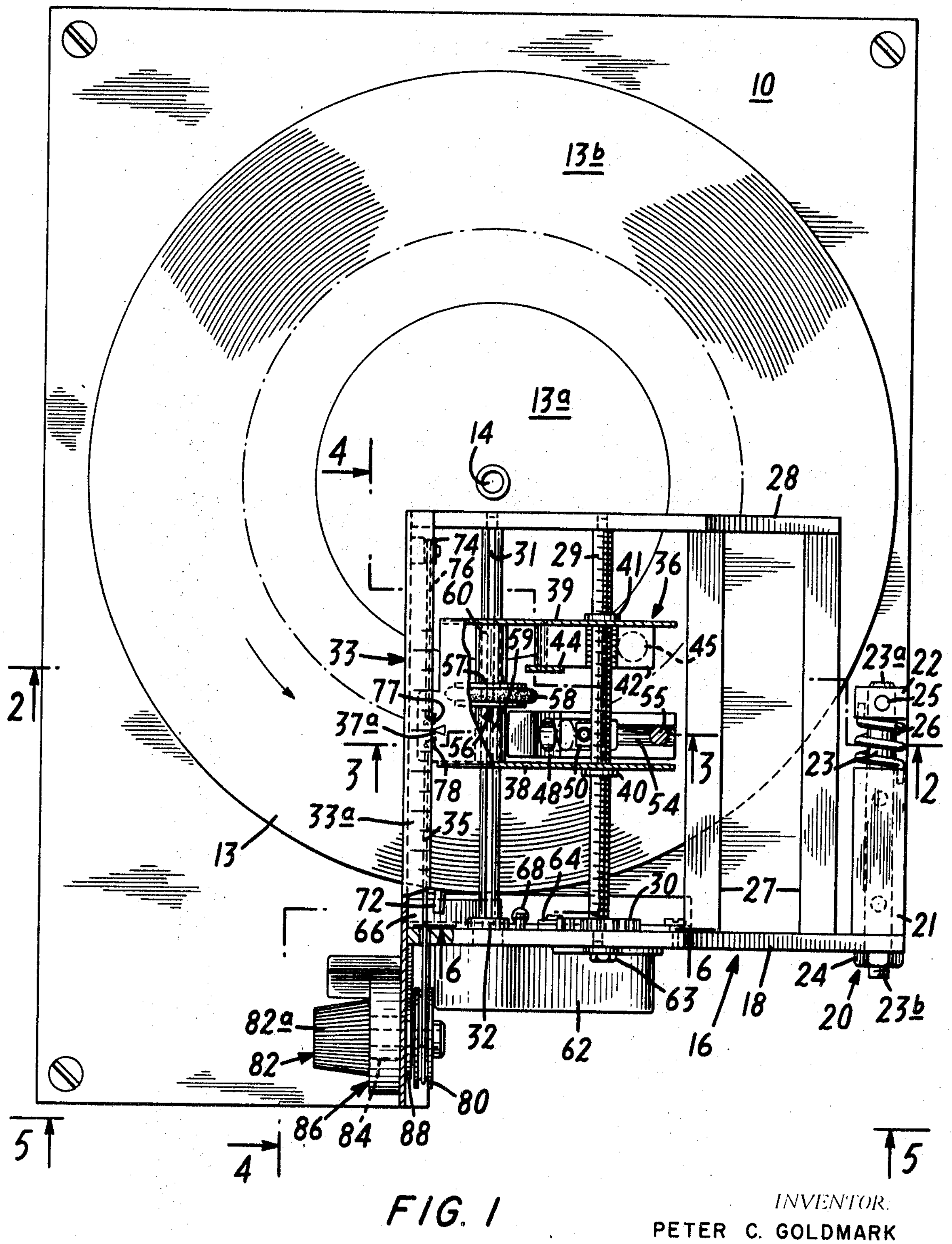
FIG. 1 is a plan view of a typical phonograph reproducing apparatus arranged according to the present invention.

In a representative embodiment of the invention, as shown in FIGS. 1–6, a phonograph deck 10 is provided which includes a circular support member 11 (FIG. 4) for supporting a turntable 12 and a grooved record disc 13 situated on top of the turntable 12. The deck 10 also includes a spindle 14 which is affixed to the support member 11 and which extends upwardly through corresponding central bores formed in the turntable 12 and the record disc 13 to rotatably support and centralize the turntable and the record disc during operation. As best shown in FIG. 1, the surface of the record disc 13 comprises an ungrooved portion 13*a* and a groove portion 13*b* having extremely narrow, closely spaced and deeply cut V-shaped grooves, the groove pitch in the portion 13*b* being in the order of 650 grooves per inch and the ratio of groove width to land area on the disc being in the order of three to one. Purely by way of example, the groove width may be .001 inch and the land width may be .0004 inch. One groove configuration which may be employed in the present invention is disclosed in my copending patent application, Ser. No. 291,915, filed July 1, 1963, and entitled "Disc Recording and Reproducing System."

In a preferred embodiment of the invention, the groove portion 13*b* of the record disc 13 has an outside diameter of 7.25 inches and an inside diameter of 3.25 inches. Because the groove pitch is 650 lines per inch, there are 1300 grooves formed in the portion 13*b*. As will be explained hereinbelow, the reproduction of program material recorded in the 1300 grooves in accordance with the invention will provide approximately three hours of uninterrupted listening enjoyment.

A support member generally indicated by the number 16, is provided which includes a motor plate 18 coupled to the deck plate 10 by a hinge block assembly 20. Included within the assembly 20 are a hinge block 21 secured to the phonograph deck 10 by bolts (not shown), a collar 22 displaced from the block 21 and a circular pin member 23 which is passed through a corresponding bore formed in the hinge block 21 and press fitted into corresponding openings formed in the collar 22 and the motor plate 18. The circular pin member 23 includes a chamfered end surface 23*a* to facilitate the insertion of the member through the collar 22 and a threaded end surface 23*b* for receiving a lock nut 24 which locks the pin member 23 to the motor plate 18.

A threaded radial opening is also formed in the collar 22 for receiving a set screw 25 which engages the pin member 23 to thereby secure the member within the collar 22. Secured at its opposite ends to the hinge block 21 and the collar 22 and surrounding the pin member 23 is a helically wound spring member 26 which exerts a rotational force against the motor plate 18 through the pin member 23 to thereby urge the support member 16 upwardly to act as a counterweight. This, as will become apparent hereinbelow, implements improved tracking by the reproducing stylus and facilitates the lifting of the support member away from the record disc 13.

The support member 16 further comprises a spacer 27, of generally U-shaped cross-section, which is secured at its opposite ends to the motor plate 18 and to an end plate 28 for the support member 16. Also extending between the plates 18 and 28 and laterally displaced from the spacer 27 is a lead screw 29, which has a pitch of 40 turns to the inch and is rotatably secured at one end to the end plate 28 and rigidly affixed at its other end to a ratchet 30. Extending parallel to the screw 28 is a splined drive shaft 31 rotatably secured at one end to the end plate 28 and frictionally secured at its other end to a motor coupling 32. At the end of the support member 16 opposite from the spacer 27, a dial strip 33 having an upper edge 33*a* and a side edge 33*b* is bolted to the motor plate 18 and to the end plate by a plurality of bolts 34 and includes graduations 35 formed in its upper edge 33*a*. Interposed between the motor plate 18 and the end plate 28 is a carriage 36 which, as will be explained hereinbelow, controls the rotation of the turntable 12 and the motion of the transducer in the grooves formed in the recording portion 13*b* of the record disc.

The carriage 36 includes a top wall 37 and front and back walls 38 and 39, the front and back walls having aligned openings through which the lead screw 29 and the splined shaft 31 are respectively inserted. Affixed to the top wall 37 is an upright pointer member 37*a* which is shaped for alignment with the graduations 35 formed in the upper edge of the dial strip 33 to thereby provide a visual indication of the location of the carriage 36 along the record disc 13. A pair of guide bushings 40 and 41 are mounted around the lead screw 29 and frictionally secured within the front and back walls 38 and 39, respectively, of the carriage for enabling the lead screw 29 to rotate without friction.

Figure 2:
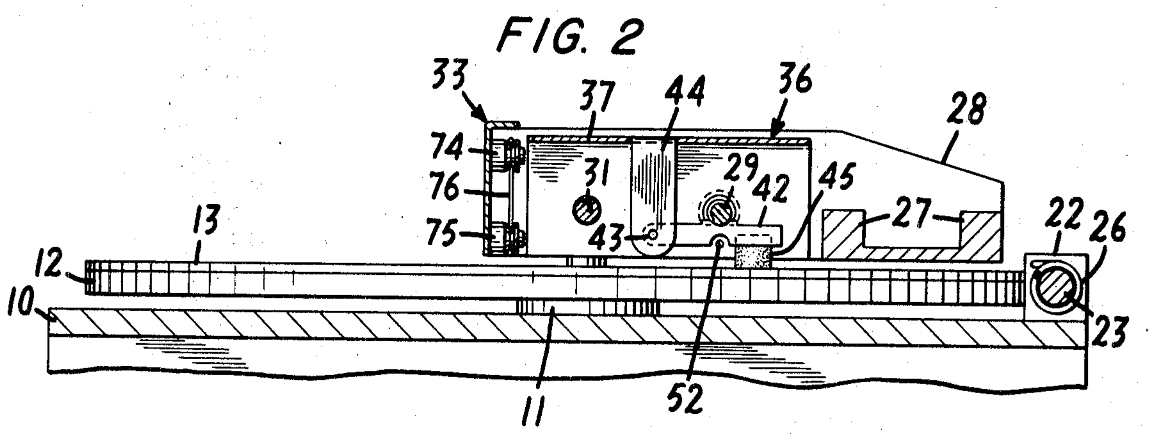
FIG. 2 is a view in cross-section of the apparatus taken along the line 2—2 of FIG. 1 and looking in the direction of the arrows.
Figures 4, 5:
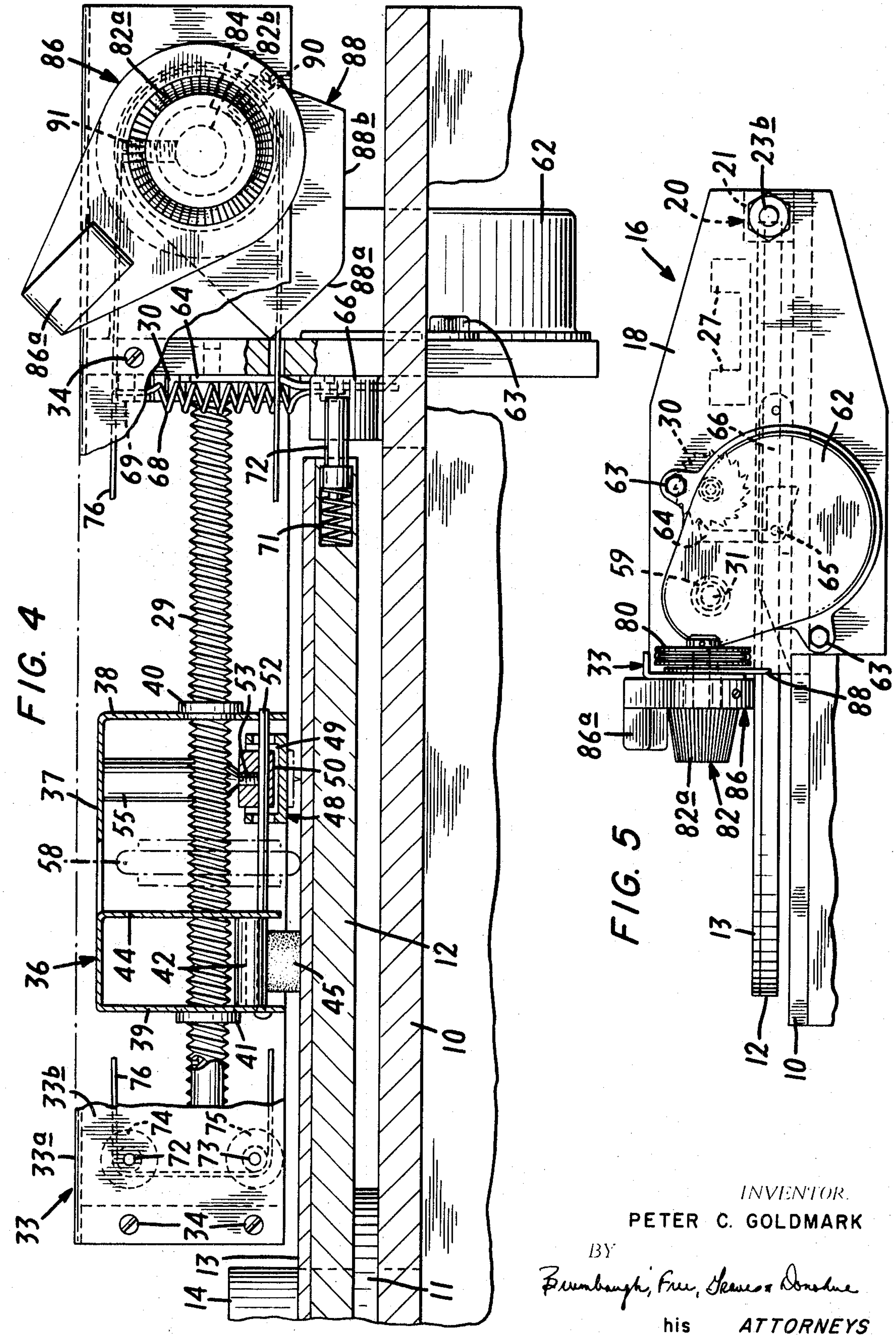
FIG. 4 is an enlarged sectional view taken along the line 4—4 of FIG. 1.
FIG. 5 is a side view of the apparatus, taken along the line 5—5 of FIG. 1.

As best shown in FIGS. 2 and 4, the carriage further includes an engagement block 42 having its upper surface cut with semicircular thread portions having a pitch of 40 teeth to the inch for threadedly engaging the lead screw 29. The engagement block 42 is pivotably mounted on a pin member 43 extending between a support 44 and the back wall 39 of the carriage 36. Affixed to the bottom of the engagement block 42 is a cylindrical felt pad 45 which rides on the surface of the record disc 13 to hold the engagement block against the screw 29. It can be seen that when the lead screw 29 is rotated with the engagement block held against it, the entire carriage 36 will be moved from the grooved portion 13*b* of the record disc toward the center and ungrooved portion 13*a*.

Figure 3:
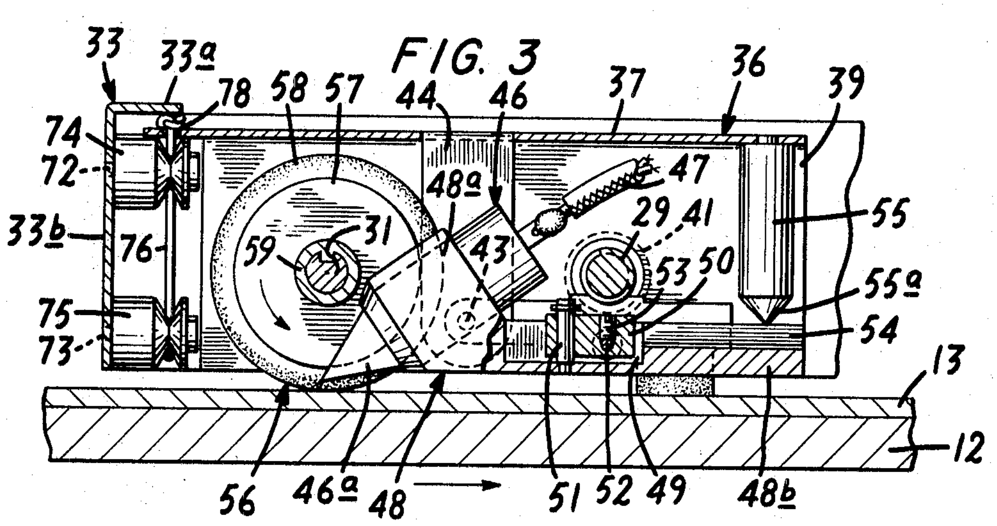
FIG. 3 is an enlarged fragmentary sectional view, taken along the line 3—3 of FIG. 1.

As best shown in FIGS. 3 and 4, a transducer 46 is provided which includes a V-shaped tip or stylus 46*a* for responding to the groove modulation of the record disc 13 and supplying corresponding electrical signals through a cable 47. To insure maximum fidelity and reliability of operation, the transducer is dimensioned such that the tip 46*a* engages the record groove at a location at least halfway down the groove during operation. This also provides an additional advantage in that surface scratches on the record 13 will usually not penetrate to the depth at which the tip contacts the grooves. The transducer is affixed within a central bore formed in the obliquely extending leg member 48*a* of a rocker arm 48. A horizontally extending leg member 48*b* of the rocker arm 48 includes a rectangularly shaped cutout 49 for receiving a rectangularly shaped swivel block 50.

To connect the swivel block 50 to the rocker arm 48 with limited freedom of motion, a swivel pin 51 is provided which is inserted through a corresponding, although slightly larger, vertical opening formed in the swivel block 50 and which terminates in a pin frictionally secured within a corresponding hole formed in the leg member 48*b* of the rocker arm. The swivel block 50 and, accordingly the transducer 46, is supported within the carriage 36 by a horizontally extending pin member 52 (FIG. 4) which is secured at opposite ends to the front and back walls 38 and 39 of the carriage 36 and which extends through a corresponding, although slightly larger, horizontal bore formed in the swivel block. A set screw 53 is provided for securing the swivel block 50 to the circular pin member 52. Because of this loose mounting of the rocker arm 48, it will have limited freedom of movement in both the vertical and horizontal directions. The horizontal movement is made possible by the insertion of the swivel pin 51 through a vertical opening formed in the block 50 which has a slightly larger diameter than the diameter of the swivel pin and the vertical movement is made possible by the insertion of the pin member 52 through a corresponding, although slightly larger, horizontal opening formed in the swivel block 50.

Also formed in the laterally extending leg member 48*b* of the rocker arm is a generally V-shaped groove 54 for receiving the conical tip 55*a* of a centering pin 55. The centering pin 55 is suspended from the top wall 37 of the carriage 36 and is sized such that the tip 55*a* will engage the groove 54 whenever excessive vertical movement by the rocker arm 48 occurs. This holds the transducer tip centered during engagement with the record groove as the support member 16 is lowered toward the record.

Supported for sliding but non-rotary motion on the splined shaft 31 is a drive wheel 56 having a rim 57 and a peripherally continuous hard rubber tire 58 mounted on the rim for engaging the record disc 13 and driving the turntable 12 in a circular path. The outside diameter of the drive wheel 56 is determined by the desired speed of motion of the record groove and by the speed of rotation of the drive shaft 31. By way of example, to provide a linear groove velocity of 100 inches per minute at the location of the drive wheel, the outside diameter of the wheel for a shaft rotation of 60 r.p.m. approximates 0.53 inch. For drive shaft speed of 40 r.p.m., the outside diameter of the wheel approximates 0.8 inch. As shown in FIGS. 1 and 3, the drive wheel is radially aligned with the transducer tip 46*a* and is retained at a fixed radial distance from the tip by a pair of collars 59 and 60 which engage the opposite sides of the rim 57 and are secured to the front and back walls, 38 and 39, respectively, of the carriage 36. It is preferable that the radial distance between the stylus 46*a* and the drive wheel 56 be kept to a minimum. As will be explained hereinbelow, the difference between the linear groove velocity between the location of the drive wheel and the location of the transducer tip changes from the outside to the inside of the record disc and, to keep this variation at a minimum the separation of these two elements should be as small as possible.

The motor coupling 32 secures the drive shaft 31 to a motor 62 which is mounted on the motor plate 18 by bolts 63. When energized, the motor drives the shaft 31 and, correspondingly, the drive wheel 56 at a constant angular velocity, such as for example, 40 or 60 revolutions per minute.

Figure 6:
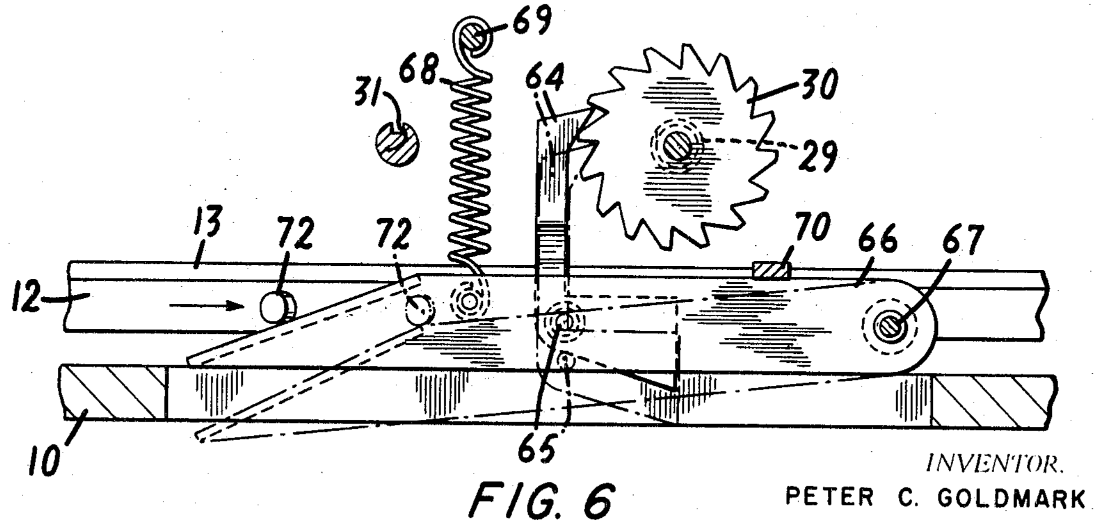
FIG. 6 is an enlarged fragmentary view taken along the line 6—6 of FIG. 1, and looking in the direction of the arrows.

As mentioned above, one end of the lead screw 29 is affixed to the ratchet 30. As best shown in FIGS. 4 and 6, the ratchet 30 comprises seventeen teeth and, accordingly, the ratchet must be actuated seventeen times to rotate the lead screw 29 one complete revolution. Because the lead screw has a pitch of forty turns to the inch, the ratchet must be actuated 680 times to move the carriage 36 one inch. The ratchet 30 is driven by a pawl 64 which is frictionally secured through a pin 65 to a trip lever 66. Bolted to the motor plate 18 is a trip lever screw 67 upon which the trip lever 66 is pivotably mounted, the free end of the lever having an upwardly inclined surface. A spring member 68, secured at one end to the motor plate 18 through a pin 69 and secured at its other end to the trip lever 66 operates to bias the pawl 64 against one tooth of the ratchet 30 through the trip lever 66. In order to prevent excessive vertical movement by the trip lever 66, a stop 70 is attached to the motor plate 18 and engages the trip lever 66 in its normally inoperative position shown in solid lines in FIG. 6.

A spring member 71, mounted in an opening formed in the periphery of the turntable 12 urges a retractable trip pin 72 outwardly so as to engage the trip lever 66 once each revolution of the turntable 12. When the pin 72 engages the trip lever 66, it rides along the inclined surface of the lever so as to gradually force the lever downwardly and thereby implement the gradual disengagement of the pawl 64 from the ratchet 30. At the lowest position of the trip lever 66, as indicated by the dashed lines in FIG. 6, the pawl 64 disengages from one tooth of the ratchet 30 and slips into engagement with an adjacent tooth of the ratchet. Thereafter, the trip lever 66 is returned to its normally inoperative position by the spring member 68. The return of the trip lever 66 to its normally inoperative position correspondingly causes the pawl 64 to exert a force against the adjacent tooth with which it is now engaged and the ratchet 30 is caused to rotate incrementally in a clockwise direction.

Rotation by the ratchet 30 causes the lead screw 29 to turn $\frac{1}{17}$ of a complete revolution and the carriage 36 will thereby be moved $\frac{1}{680}$ of an inch along the lead screw toward the center of the record disc 13. It is noticeable that rotation by the turntable 12 is not impeded appreciably by this operation because of the shallow inclination of the trip lever 66 which provides for the gradual stepping of the ratchet. Moreover, the spring member 68 has a small spring constant such that the trip lever 66 does not bounce back to its normally inoperative state but rather gently returns to its normally inoperative state such that the lead screw 30 is not turned abruptly. Because of the looseness of the transducer mounting as described above, tracking of the stylus is not impaired by this intermittent operation.

As mentioned above, the dial strip 33 is secured to the motor plate 18 and the end plate 28 of the support member 16 by bolts 34 and includes graduations 35 formed in its upper surface **33*a* (FIG. 1). As best shown in FIGS. 3 and 4, the side edge 33*b* of the strip includes a pair of pulley pins 72 and 73 frictionally secured within vertically spaced apart and corresponding openings formed in the edge 33*b* in proximity to the end plate 28. Two nylon pulleys 74 and 75, are rotatably supported on the pulley pins 72 and 73**, respectively.

The opposite ends of the dial cord 76 extend through two openings 77 and 78 formed in the top wall 37 of the carriage 36 and are knotted to provide a driving connection to the carriage 36 (FIG. 1). The dial cord 76 passes around the pulleys 74 and 75 and a drive pulley 80 at the opposite end of the dial strip 33 and a dial knob assembly 82 connected to the pulley 80, is secured to the side edge **33*b* of the dial strip. The dial knob assembly 82 includes a knurled knob 82*a* and a shaft 82*b* which is inserted through a bushing 84 and attached to the dial pulley 80 on the opposite side of the strip such that the dial pulley 8 rotates when the knob 82*a* is turned. The bushing 84 is frictionally secured within corresponding central bores formed in a positioning knob 86 and a cam 88, the knob 86 and the cam 88 being located on opposite sides of the dial strip 33, the knob being employing for lifting the support member 16 away from the record disc 13. The positioning knob 86 is provided with a projecting handle 86*a* which facilitates the lifting operation while the cam 88 includes two cam surfaces 88*a* and 88*b* at unequal spacings from the bushing 84**.

The positioning knob 86 also has a threaded opening for receiving a set screw 90 which engages the bushing 84 to prevent slippage by the bushing within the knob 86 and the cam 88. Similarly, the dial pulley 80 includes a threaded opening for receiving a set screw 91 which engages the shaft **82*b* of the dial knob assembly to thereby preclude slippage by the shaft within the central dial pulley 80. In the playing position, the handle 86*a* of the positioning knob is rotated so that the cam surface 88*b* which is closer to the turning axis is parallel with the upper surfaces of the phonograph deck 10 and the side 88*a* of the cam abuts the motor plate 18. Rotation of the cam to this position permits smooth engagement of the stylus in the record groove. For disengagement of the stylus, the handle 86*a* of the knob is rotated so that the side 88*a* of the cam farther from the turning axis contacts the surface of the deck 10. When this occurs the support member 16 is supported and maintained displaced from the record disc 13 by the cam 88**.

When the support member 16 is raised away from the record disc 13 by the positioning knob 86, the engagement block 42 is disconnected from the screw 29 and the carriage 36 may then be returned from the inside of the record disc 13 to the outside of the disc by turning the knurled knob **82*a* in a clockwise direction as viewed in FIG. 4. Because the dial pulley 80 is secured to the shaft 82*b* of the dial knob assembly and because the opposite ends of the dial cord 76 are secured to the carriage 36, the clockwise rotation of the knurled knob 82*a* will cause the carriage 36 to move along the drive shaft 31 and lead screw 29 toward the outside portion of the record disc 13. It is noteworthy that, although the engagement block 42 (FIG. 2) is disengaged from the lead screw 29, the block continues to ride along the record disc 13**.

As mentioned above, the ideal condition exists when the linear velocity of the transducer stylus 46 remains constant at both the inside and outside groove portions of the record disc 13. However, because of the separation between the transducer stylus 46 and the drive wheel 56, which may be, for example, ⅜ inch the linear velocity of the groove at the stylus 46 increases slightly for constant velocity at the drive wheel 56 as the carriage 36 is moved along the record disc 13 toward the inner groove portions of the disc. This is true because the relationship between the linear velocities at the drive wheel 56 and the stylus 46 is directly proportional to the respective distances of the drive wheel and the stylus from the center of the record disc 13. More specifically:

$$\frac{Vs}{Vw}=\frac{Rs}{Rw} \text{ or } Vs=\frac{VwRs}{Rw}$$

where

V*s* equals the linear velocity at the stylus 46;

V*w* equals the linear velocity at the drive wheel 56;

R*s* equals the distance between the stylus 46 and the center of the record disc 13; and R*w* equals the distance between the drive wheel 56 and the center of the record disc 13.

Moreover, $Vw=\pi Dw\times$r.p.m. where D*w* equals the diameter of the drive wheel 56. Accordingly, for a drive shaft speed of 40 r.p.m. or ⅔ r.p.s. and a drive wheel diameter of 0.8 inch, $$Vw = \pi(.8)(2/3)$$

and $$Vs = 1.67 Rs/Rw$$

The following is a compilation of the linear velocity at the stylus 46 and the angular velocity of the record disc 13 at equidistant spacings of 0.25 inch for a 7.25-inch record and a 1.67-in./sec. groove velocity at the drive wheel and a ⅜-inch separation between the drive wheel and the stylus.

| Rs | Rw | Rs/Rw | Vs, inches/sec. | Angular velocity, r.p.m. |
|---|---|---|---|---|
| 3.625 | 3.25 | 1.11 | 1.85 | 4.9 |
| 3.37 | 3.00 | 1.12 | 1.87 | 5.37 |
| 3.12 | 2.75 | 1.13 | 1.89 | 5.75 |
| 2.87 | 2.50 | 1.15 | 1.92 | 6.35 |
| 2.62 | 2.25 | 1.17 | 1.95 | 7.1 |
| 2.37 | 2.00 | 1.19 | 1.98 | 7.95 |
| 2.12 | 1.75 | 1.21 | 2.02 | 9.05 |
| 1.87 | 1.50 | 1.25 | 2.1 | 10.7 |
| 1.625 | 1.25 | 1.30 | 2.16 | 12.6 |

The linear velocity at the stylus 46 for the outside groove portions, that is, 1.85 inches/sec., represents a critical velocity in that the stylus will not accurately reproduce high frequency information at lower groove velocities. It can be seen that the linear velocity of the groove increases slightly as the carriage 36 moves toward the center of the record disc 13. Accordingly, the information recorded on the record disc will have a corresponding slight change in frequency from the outside of the disc to the inside so as to assure perfect reproduction.

The above-described phonograph apparatus and associated record discs might find particular applicability in the area of educational aids for the blind. Under these conditions for use, it is desirable that as much playback time as possible be provided by each side of the record disc so as to minimize the handling of the record and the apparatus by the blind listener. The playing time for one side of a record disc of the above-described type having an outside diameter of 7.25 inches is approximately 3.2 hours and, correspondingly, the playing time for both sides is approximately 6.4 hours.

In operation, the support member 16 is raised away from the turntable 12 by rotating the handle 86*a* of the positioning knob 86 until the side 88*a* of the cam 88 is in contact with the upper surface of the phonograph deck 10 and then pivoting the member upwardly about the hinge 20. With the support member in the raised position a record 13 is placed on the turntable and the support member is then lowered until the cam surface 88*a* engages the deck. In this condition the support member 16 and the carriage 36 will remain displaced from the turntable 12 and by rotating the knurled knob 82*a* in a clockwise direction, the carriage 36 is moved laterally across the record disc until the stylus 46 is positioned over the outside groove of the record as indicated by the pointer 37*a* on the graduated scale 33*a*. Thereafter, the knob 86 is rotated counterclockwise until the side 88*b* of the cam 88 is parallel to the surface of the phonograph deck 10, thereby lowering the carriage so that the drive wheel 56 is in contact with the surface of the record disc and the engagement block 42 threadedly engages the lead screw 29.

With the motor 62 energized, the drive wheel 56, which is driven at a constant angular velocity by the shaft 31, will drive the record disc 13 in a circular path at the desired linear groove speed which, as described above, will vary only by a small amount from the outside to the inside portion of the record. During each revolution of the turntable, the ratchet 30 is actuated by the pawl 64 to rotate the lead screw 29. In turn, the lead screw 29 drives the carriage across the record disc 13. At the end of the record playback, which may last for more than three hours, the support member 16 is raised from the record disc by rotation of the cam 88 and the motor 62 is deenergized.

Although the invention has been described herein with reference to a specific embodiment many modifications and variations therein will readily occur to those skilled in the art. Accordingly, all variations and modifications are included within the intended scope of the invention.

What is claimed is:

1. A phonograph apparatus comprising support means for supporting a record disc and permitting rotation thereof, transducer means responsive to modulations in the grooves of the record disc for providing corresponding electrical signals, record drive means engagable with the surface of the record disc for rotating the record disc at a predetermined linear groove speed and motive means operatively connected to the transducer means and the record drive means and responsive to the rotation of the record disc through a predetermined arc for incrementally moving the record drive means and the transducer means radially across the surface of the record disc from the outer groove portions thereof to the inner groove portions thereof.

2. Phonograph apparatus according to claim 1 further comprising carriage means extending above a portion of the record disc for supporting the transducer means and the record drive means above the surface of the record disc and moved incrementally by the motive means.

3. Phonograph apparatus according to claim 2 wherein the carriage means comprises a first portion for supporting the record drive means, a rocker arm means for flexibly supporting the transducer means and for maintaining the transducer means radially align with the record drive means and spacer means for maintaining the drive means at a constant separation from the transducer means.

4. Phonograph apparatus according to claim 3 wherein the motive means comprises lead screw means for threaded engagement with the carriage means, ratchet means for rotating the lead screw means, and pawl means responsive to the rotation of the record disc for actuating the ratchet means once each revolution of the record disc.

5. Apparatus according to claim 4 wherein the support means comprises turntable means for supporting the record disc and permitting the rotation thereof, the turntable means including retractable pin means for actuating the pawl means once each revolution of the turntable.

6. Apparatus according to claim 5 wherein the record drive means comprises a drive wheel for frictional engagement with the surface of the record disc, a splined shaft for supporting the drive wheel and a motor for driving the splined shaft at a constant angular velocity.

7. Phonograph apparatus comprising a phonograph deck, a turntable rotatably mounted on the phonograph deck, a record disc mounted on the turntable and having a surface of extremely narrow, closely spaced and deeply cut grooves, a support member pivotably mounted on the phonograph deck, the support member including rotatable lead screw means and a rotatable splined shaft, a carriage extending above a portion of the record disc and adapted for threaded engagement with the rotatable lead screw, a reproducing stylus supported by the carriage for deep-seated engagement with the grooves of the record disc, a motor secured to the support member for driving the splined shaft at a constant angular velocity, a record drive wheel supported by the splined shaft and maintained in alignment with the stylus by the carriage for driving the turntable in a circular path at a selected linear groove velocity, ratchet means for rotating the lead screw, and a pawl responsive to the circular movement of the turntable for actuating the ratchet means once each revolution of the turntable, whereby the turntable is driven at an increasing angular velocity by the record drive wheel as the carriage is moved laterally across the record disc by the lead screw means.

8. Apparatus according to claim 7 wherein the record disc comprises a plurality of grooves, each groove being relatively narrow and deeply cut, the rotatable lead screw comprises a lead screw having a pitch of 40 turns per inch and the ratchet means comprises a ratchet having 17 tooth portions.

References Cited

UNITED STATES PATENTS

| | | | |
|---|---|---|---|
| 2,692,141 | 10/1954 | Rudinauer | 274—9 |
| 2,185,933 | 1/1940 | Tieland | 274—9 |

FOREIGN PATENTS

| | | |
|---|---|---|
| 136,445 | 1950 | Sweden. |
| 378,449 | 1932 | Great Britain. |

HARRY N. HAROIAN, Primary Examiner

U.S. Cl. X.R.

274—23

UNITED STATES PATENT OFFICE
CERTIFICATE OF CORRECTION

Patent No. 3,536,331 Dated October 27, 1970

Inventor(s) Peter C. Goldmark

It is certified that error appears in the above-identified patent and that said Letters Patent are hereby corrected as shown below:

Column 1, line 53, after "invention" insert -- to provide --; line 64, "photograph" should read -- phonograph --. Column 6, line 3, "8" should read -- 80 --; line 7, "employing" should read -- employed --; line 23, "surfaces" should read -- surface --. Column 8, line 43, "align" should read -- aligned --.

Signed and sealed this 8th day of June 1971.

(SEAL)
Attest:

EDWARD M.FLETCHER,JR.
Attesting Officer

WILLIAM E. SCHUYLER, JR.
Commissioner of Patents